United States Patent
Ghandour (10) Patent No.: US 12,454,365 B1
(45) Date of Patent: Oct. 28, 2025

(54) NACELLE ACTUATION AND CONTROL ASSEMBLY FOR AN AIRCRAFT PROPULSION SYSTEM

(71) Applicant: Rohr, Inc., Chula Vista, CA (US)

(72) Inventor: Imad Ghandour, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/798,131

(22) Filed: Aug. 8, 2024

Related U.S. Application Data (60) Provisional application No. 63/531,457, filed on Aug. 8, 2023.

(51) Int. Cl.
*B64D 29/06* (2006.01)
*F02K 1/76* (2006.01)

(52) U.S. Cl.
CPC .............. *B64D 29/06* (2013.01); *F02K 1/763* (2013.01)

(58) Field of Classification Search
CPC ........... B64D 29/06; B64D 29/08; F02K 1/76; F02K 1/763; F02K 1/80
See application file for complete search history.

(56) References Cited

U.S. PATENT DOCUMENTS

| | | | |
|---|---|---|---|
| 6,227,485 B1 | 5/2001 | Porte | |
| 6,622,963 B1 | 9/2003 | Ahrendt | |
| 8,621,978 B2 | 1/2014 | Moradell-Casellas | |
| 9,650,917 B2 | 5/2017 | Stewart | |
| 9,701,414 B2 | 7/2017 | Vaughan | |
| 11,072,415 B2 | 7/2021 | West | |
| 2003/0192987 A1* | 10/2003 | Ahrendt | B64D 29/08 244/54 |
| 2011/0200431 A1 | 8/2011 | Lederle | |
| 2011/0250054 A1* | 10/2011 | Pereira | B64D 29/08 415/126 |
| 2015/0078879 A1* | 3/2015 | Vaughan | B64D 29/06 415/201 |
| 2016/0123238 A1* | 5/2016 | Kay | F01D 9/041 415/118 |
| 2016/0229546 A1* | 8/2016 | Chavignier | F16H 25/2021 |
| 2019/0168884 A1* | 6/2019 | Stafford | B64D 29/08 |
| 2021/0288449 A1* | 9/2021 | Gok | H01R 24/64 |

* cited by examiner

Primary Examiner — Andrew H Nguyen
(74) Attorney, Agent, or Firm — Getz Balich LLC (57) ABSTRACT

An assembly for an aircraft propulsion system includes a nacelle, at least one fan cowl actuator, at least one C-duct actuator, and a controller. The nacelle includes an outer structure including a fan cowl and a thrust reverser. The fan cowl includes at least one fan cowl door. The thrust reverser includes at least one C-duct door. The at least one fan cowl actuator is mounted to the at least one fan cowl door. The at least one C-duct actuator is mounted to the at least one C-duct door. The controller is configured to selectively direct electrical power from a power supply to (1) the fan cowl actuator electric motor to control a fan cowl position of the at least one fan cowl door and (2) the C-duct actuator electric motor to control a C-duct position of the at least one C-duct door.

20 Claims, 3 Drawing Sheets

NACELLE ACTUATION AND CONTROL ASSEMBLY FOR AN AIRCRAFT PROPULSION SYSTEM

This application claims priority to U.S. Patent Appln. No. 63/531,457 filed Aug. 8, 2023, which is hereby incorporated herein by reference in its entirety.

BACKGROUND

1. Technical Field

This disclosure relates generally to an aircraft propulsion system nacelle and, more particularly, to actuation and control assemblies for aircraft propulsion system nacelle cowls.

2. Background Information

Aircraft propulsion system nacelles may include movable cowls to facilitate access to internal spaces and components of the aircraft propulsion system. Actuation systems may be used to move the cowls between their open and closed positions. Various actuation systems are known in the art for moving and controlling cowl positions. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes a nacelle, at least one fan cowl actuator, at least one C-duct actuator, and a controller. The nacelle includes an outer structure including a fan cowl and a thrust reverser. The fan cowl includes at least one fan cowl door. The at least one fan cowl door is movable between a fan cowl open position and a fan cowl closed position. The thrust reverser includes at least one C-duct door. The at least one C-duct door is movable between a C-duct open position and a C-duct closed position. The at least one fan cowl actuator is mounted to the at least one fan cowl door. Each of the at least one fan cowl actuator includes a fan cowl actuator electric motor configured to drive a respective one of the at least one fan cowl actuator to move the at least one fan cowl door between the fan cowl open position and the fan cowl closed position. The at least one C-duct actuator is mounted to the at least one C-duct door. Each of the at least one C-duct actuator including a C-duct actuator electric motor configured to drive a respective one of the at least one C-duct actuator to move the at least one C-duct door between the C-duct open position and the C-duct closed position. The controller is electrically connected to the fan cowl actuator electric motor for each of the at least one fan cowl actuator and the C-duct actuator electric motor for each of the at least one C-duct actuator. The controller includes a processor in communication with a non-transitory memory storing instructions, which instructions when executed by the processor, cause the processor to selectively direct electrical power from a power supply to (1) the fan cowl actuator electric motor for each of the at least one fan cowl actuator to control a fan cowl position of the at least one fan cowl door using the at least one fan cowl actuator and (2) the C-duct actuator electric motor for each of the at least one C-duct actuator to control a C-duct position of the at least one C-duct door using the at least one C-duct actuator.

In any of the aspects or embodiments described above and herein, the nacelle may further include a pylon. The controller may be disposed at the pylon.

In any of the aspects or embodiments described above and herein, the instructions, when executed by the processor, may further cause the processor to control the controller to receive a first electrical power from the power supply, form a second electrical power by changing one or both of a voltage or a frequency of the first electrical power, and distribute the second electrical power to the fan cowl actuator electric motor for each of the at least one fan cowl actuator or the C-duct actuator electric motor for each of the at least one C-duct actuator.

In any of the aspects or embodiments described above and herein, the assembly may further include at least one outer operating switch connected in signal communication with the controller. The at least one outer operating switch may be disposed on the outer structure. The at least one outer operating switch is configured to direct a fan cowl actuator control signal to the controller to selectively direct electrical power from the power supply to the fan cowl actuator electric motor for each of the at least one fan cowl actuator to control the fan cowl position of the at least one fan cowl door using the at least one fan cowl actuator.

In any of the aspects or embodiments described above and herein, the assembly may further include at least one inner operating switch connected in signal communication with the controller. The at least one inner operating switch may be disposed within the outer structure. The at least one inner operating switch may be configured to direct a C-duct actuator control signal to the controller to selectively direct electrical power from the power supply to the C-duct actuator electric motor for each of the at least one C-duct actuator to control the C-duct position of the at least one C-duct door using the at least one C-duct actuator.

In any of the aspects or embodiments described above and herein, the at least one fan cowl door may include a first fan cowl door and a second fan cowl door. The at least one fan cowl actuator may include a first fan cowl actuator mounted to the first fan cowl door and a second fan cowl actuator mounted to the second fan cowl door.

In any of the aspects or embodiments described above and herein, the at least one C-duct door may include a first C-duct door and a second C-duct door. The at least one C-duct actuator may include a first C-duct actuator mounted to the first C-duct door and a second C-duct actuator mounted to the second C-duct door.

In any of the aspects or embodiments described above and herein, each of the at least one C-duct actuator includes a manual drive unit.

In any of the aspects or embodiments described above and herein, the instructions, when executed by the processor, may further cause the processor to detect a high-temperature condition of one or more of the at least one fan cowl actuator and the at least one C-duct actuator and provide a signal to an aircraft control system identifying the detected high-temperature condition.

According to another aspect of the present disclosure, an assembly for an aircraft propulsion system includes a nacelle, a first actuator, a second actuator, and a controller. The nacelle includes a first pivotable door and a second pivotable door. Each of the first pivotable door and the second pivotable door is pivotable between an open position and a closed position. The first actuator is mounted to the first pivotable door. The first actuator includes a first actuator body and a first electric motor disposed at the first actuator body. The first electric motor is configured to drive the first actuator to move the first pivotable door between the open position and the closed position. The second actuator is mounted to the second pivotable door. The second actuator includes a second actuator body and a second electric motor disposed at the second actuator body. The second electric motor is configured to drive the second actuator to move the second pivotable door between the open position and the closed position. The controller is electrically connected to the first electric motor and the second electric motor. The controller includes a processor in communication with a non-transitory memory storing instructions, which instructions when executed by the processor, cause the processor to selectively direct electrical power from an aircraft power supply to (1) the first electric motor to control a first position of the first pivotable door using the first actuator and (2) the second electric motor to control a second position of the second pivotable door using the second actuator.

In any of the aspects or embodiments described above and herein, the nacelle may further include a pylon. The controller may be disposed at the pylon.

In any of the aspects or embodiments described above and herein, the instructions, when executed by the processor, may further cause the processor to control the controller to receive a first electrical power from the power supply, form a second electrical power by changing one or both of a voltage or a frequency of the first electrical power, and distribute the second electrical power to the first electric motor and the second electric motor to control the first position of the first pivotable door using the first actuator and to control the second position of the second pivotable door using the second actuator, respectively.

In any of the aspects or embodiments described above and herein, the assembly may further include a fan case. The first actuator and the second actuator may be disposed axially coincident with the fan case.

In any of the aspects or embodiments described above and herein, the controller may be disposed outside of the fan case.

According to another aspect of the disclosure, an assembly for an aircraft propulsion system includes a nacelle, at least one first actuator, at least one second actuator, and a controller. The nacelle includes an outer structure including a first structure portion and second structure portion. The first structure portion includes at least one first moveable door. The at least one first moveable door is movable between a first door open position and a first door position. The second structure portion includes at least one second moveable door. The at least one second moveable door is movable between a second door open position and a second door closed position. The at least one first actuator is mounted to the at least one first moveable door. Each of the at least one first actuator includes a first electric motor configured to drive a respective one of the at least one first actuator to move the at least one first moveable door between the first door open position and the first door closed position. The at least one second actuator is mounted to the at least one second moveable door. Each of the at least one second actuator includes a second electric motor configured to drive a respective one of the at least one second actuator to move the at least one second moveable door between the first door open position and the first door closed position. The controller is electrically connected to the first electric motor for each of the at least one first actuator, the second electric motor for each of the at least one second actuator, and a power supply. The controller includes a processor in communication with a non-transitory memory storing instructions, which instructions when executed by the processor, cause the processor to receive first electrical power from the power supply, form a second electrical power by changing one or both of a voltage or a frequency of the first electrical power, and selectively distribute the second electrical power to the first electric motor for each of the at least one first actuator or the second electric motor for each of the at least one second actuator.

In any of the aspects or embodiments described above and herein, the assembly may further include a fan case. The at least one first actuator may be disposed axially coincident with the fan case.

In any of the aspects or embodiments described above and herein, the controller may be disposed at the fan case.

In any of the aspects or embodiments described above and herein, the instructions, when executed by the processor, may further cause the processor to detect a high-temperature condition of one or more of the at least one first actuator and the at least one second actuator and provide a signal to an aircraft control system identifying the detected high-temperature condition.

In any of the aspects or embodiments described above and herein, the instructions, when executed by the processor, further cause the processor to isolate the second electrical power to the first electric motor for each of the at least one first actuator or the second electric motor for each of the at least one second actuator in response to the detected high-temperature condition.

In any of the aspects or embodiments described above and herein, the assembly may further include at least one outer operating switch and at least one inner operating switch. The at least one outer operating switch may be connected in signal communication with the controller. The at least one outer operating switch may be disposed on the outer structure. The at least one outer operating switch may be configured to direct a first actuator control signal to the controller to selectively direct electrical power from the power supply to the first actuator electric motor for each of the at least one first actuator to control a first door position of the at least one first moveable door using the at least one first actuator. The at least one inner operating switch may be connected in signal communication with the controller. The at least one inner operating switch may be disposed within the outer structure. The at least one inner operating switch may be configured to direct a second actuator control signal to the controller to selectively direct electrical power from the power supply to the second actuator electric motor for each of the at least one second actuator to control a second door position of the at least one second moveable door using the at least one second actuator.

The present disclosure, and all its aspects, embodiments and advantages associated therewith will become more readily apparent in view of the detailed description provided below, including the accompanying drawings.

DETAILED DESCRIPTION

Figure 1:
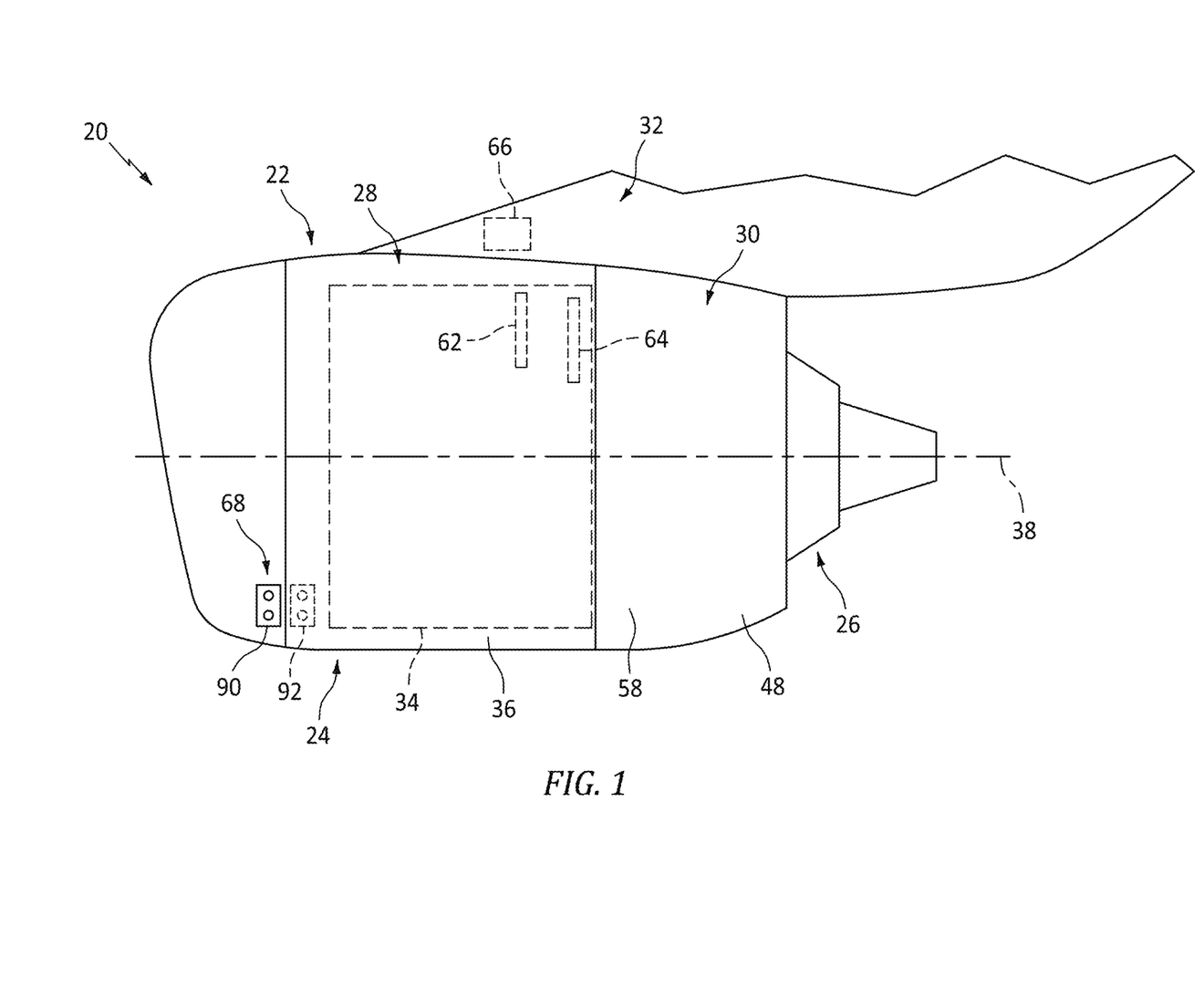
FIG. 1 illustrates a side view of an aircraft propulsion system, in accordance with one or more embodiments of the present disclosure.

FIG. 1 illustrates an aircraft propulsion system 20 for an aircraft such as, but not limited to, a commercial airliner or a cargo plane. The propulsion system includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 of FIG. 1 includes a nacelle outer structure 24 and a nacelle inner structure 26, which inner structure 26 may sometimes be referred to as an inner fixed structure (IFS). The nacelle outer structure 24 of FIG. 1 includes a fan cowl 28 and a thrust reverser 30 extending circumferentially about (e.g., completely around) an axial centerline 38 of the propulsion system 20. The thrust reverser 30 of FIG. 1 is disposed axially adjacent and aft of the fan cowl 28. The nacelle inner structure 26 extends through the nacelle outer structure 24. The nacelle inner structure 26 houses and supports a core of the gas turbine engine for the propulsion system 20. This engine core may include a compressor section, a combustor section, and a turbine section. However, the present disclosure is not limited to any particular configuration of the engine core. The nacelle outer structure 24 and the nacelle inner structure 26 may form a bypass air flow path radially therebetween. The propulsion system 20 (e.g., the nacelle outer structure 24 and/or the nacelle inner structure 26) may be mounted to a component of the aircraft (e.g., an aircraft wing, an aircraft fuselage, etc.) by a pylon 32. Note, while the aircraft propulsion system 20 of FIG. 1 is shown for an underwing type application, the aircraft propulsion system 20 may alternatively be mounted for an above-wing or blended wing type application.

Figure 2:
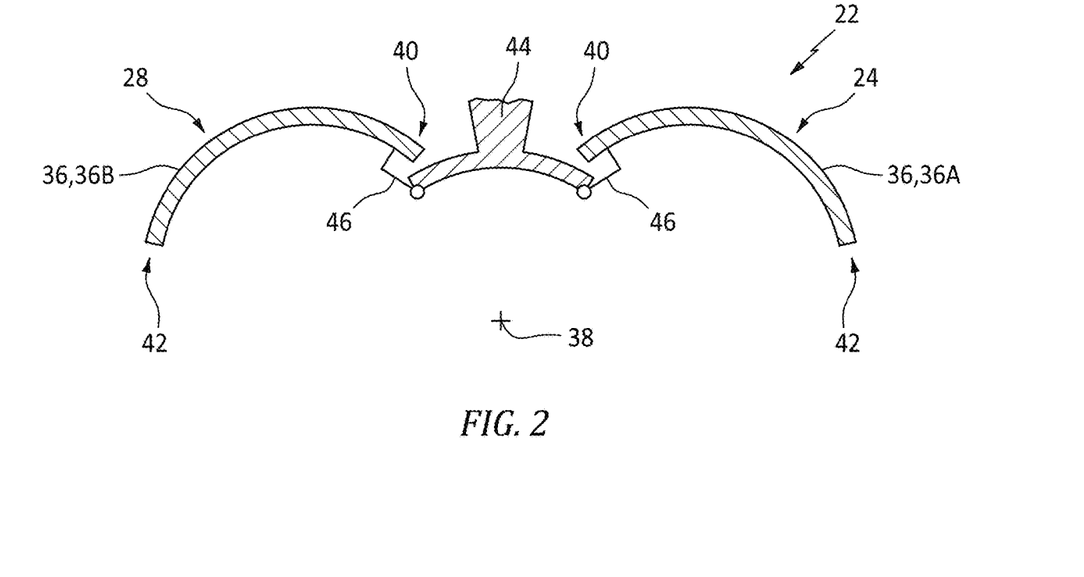
FIG. 2 illustrates a cutaway view of a portion of a fan cowl for a nacelle of the aircraft propulsion system, in accordance with one or more embodiments of the present disclosure.

Referring to FIG. 1, the nacelle outer structure 24 covers a fan case 34 that circumscribes a fan section of the gas turbine engine. Referring to FIG. 2, the fan cowl 28 is configured with one or more movable (e.g., pivotable) outer structure components. These outer structure components of the fan cowl 28 may be configured as or otherwise include fan cowl doors 36. For example, the fan cowl doors 36 of FIG. 2 include a right-hand (RH) fan cowl door 36A and a left-hand (LH) fan cowl door 36B. Each of the fan cowl doors 36 extends circumferentially about the axial centerline 38. In particular, each of the fan cowl doors 36 extends circumferentially between a first end 40 (e.g., upper edge) and a second end 42 (e.g., lower edge). The first end 40 may be pivotally connected to a fixed structure 44 (e.g., a bifurcation structure and/or the pylon 32) of the nacelle 22 by, for example, a hinge 46. Each of the fan cowl doors 36 is thereby operable to move (e.g., pivot) between a fan cowl closed position (position of FIG. 1) and a fan cowl open position (position of FIG. 2). The second ends 42 of the fan cowl doors 36 may be configured to latch together so as to retain the fan cowl doors 36 together in their respective fan cowl closed positions.

Figure 3:
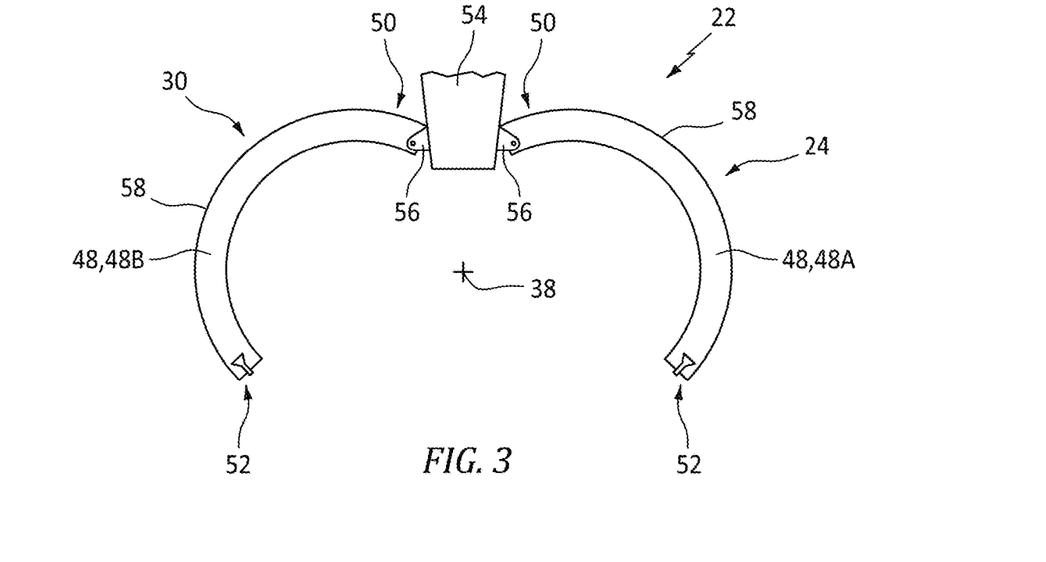
FIG. 3 illustrates a cutaway view of a portion of a thrust reverser for a nacelle of the aircraft propulsion system, in accordance with one or more embodiments of the present disclosure.

Referring to FIG. 3, the thrust reverser 30 is also configured with one or more movable (e.g., pivotable) outer structure components. These outer structure components of the thrust reverser 30 may be configured as or otherwise include C-duct doors 48. For example, the C-duct doors 48 of FIG. 3 include a right-hand (RH) C-duct door 48A and a left-hand (LH) C-duct door 48B. The C-duct doors 48 are disposed axially adjacent and aft of the fan cowl doors 36. Each of the C-duct doors 48 extends circumferentially about the axial centerline 38. In particular, each of the C-duct doors 48 extends circumferentially between a first end 50 (e.g., upper edge) and a second end 52 (e.g., lower edge). The first end 50 may be pivotally connected to a fixed structure 54 (e.g., a bifurcation structure and/or the pylon 32) of the nacelle 22 by, for example, a hinge 56. The fixed structure 54 may be disposed within a portion of the outer structure 24 such as the fan cowl 28 (e.g., at an aft end of the fan cowl 28) or the thrust reverser 30. Each of the C-duct doors 48 is thereby operable to move (e.g., pivot) between a C-duct closed position (position of FIG. 1) and a C-duct open position (position of FIG. 3). The second ends 52 of the C-duct doors 48 may be configured to latch together so as to retain the C-duct doors 48 together in their respective C-duct closed positions. Each of the C-duct doors 48 may include or otherwise form a portion of a translating sleeve 58 for the thrust reverser 30. The translating sleeve 58 is configured for translation (e.g., axial translation) along the axial centerline 38 between a stowed position (position of FIG. 1) and a deployed position axially aft of the stowed position. In the deployed position of the translating sleeve, the thrust reverser 30 is configured to direct air from the bypass air flow path in a forward direction to generate reverse thrust for the propulsion system (see FIG. 1).

Figure 4:
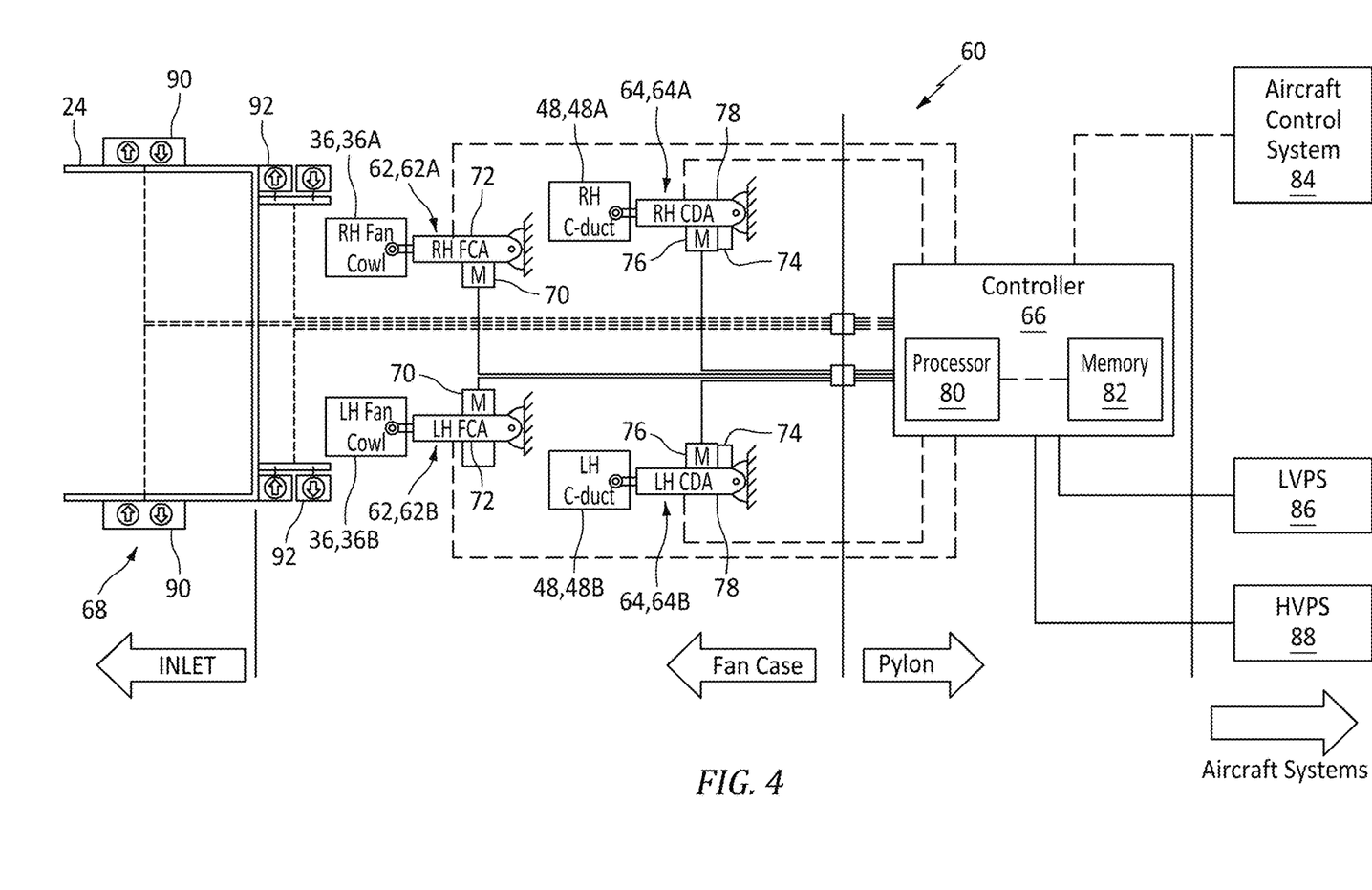
FIG. 4 schematically illustrates a control assembly for actuators of the fan cowl and the thrust reverser, in accordance with one or more embodiments of the present disclosure.

FIG. 4 schematically illustrates a control assembly 60 for the fan cowl doors 36 and the C-duct doors 48. The control assembly 60 includes at least one fan cowl actuator 62 for each of the fan cowl doors 36 (e.g., the RH fan cowl door 36A and the LH fan cowl door 36B). The control assembly 60 includes at least one C-duct actuator 64 for each of the C-duct doors 48 (e.g., the RH C-duct door 48A and the LH C-duct door 48B). The control assembly 60 further includes a controller 66 and a plurality of operating switches 68.

Each of the fan cowl actuators 62 is configured to position a respective one of the fan cowl doors 36 in the fan cowl closed position, the fan cowl open position, or an intermediate position between the fan cowl closed position and the fan cowl open position. The fan cowl actuators 62 may be configured as linear actuators such as, but not limited to, a ball screw actuator. Each of the fan cowl actuators 62 extends between and connects a respective one of the fan cowl doors 36 with a fixed structure of the nacelle 22 such as, but not limited to, the fixed structure 44. FIG. 1 illustrates an exemplary position of the fan cowl actuators 62 at (e.g., on, adjacent, or proximate) the fan case 34, however, the present disclosure is not limited to the foregoing exemplary position of the fan cowl actuators 62. The fan cowl actuators 62 of FIG. 4 include a RH fan cowl actuator 62A for the RH fan cowl door 36A and a LH fan cowl actuator 62B for the LH fan cowl door 36B. However, the fan cowl actuators 62 may include more than one RH fan cowl actuator 62A for the RH fan cowl door 36A and more than one LH fan cowl actuator 62B for the LH fan cowl door 36B.

Each of the fan cowl actuators 62 includes an electric motor 70 configured to drive each respective fan cowl actuator 62 to position a respective one of the fan cowl doors 36 in the fan cowl closed position, the fan cowl open position, or an intermediate position between the fan cowl closed position and the fan cowl open position. Each of the electric motors 70 of FIG. 4 are integrated with or otherwise disposed at (e.g., on, adjacent, or proximate) an actuator body 72 of a respective one of the fan cowl actuators 62.

Each of the C-duct actuators 64 is configured to position a respective one of the C-duct doors 48 in the C-duct closed position, the C-duct open position, or an intermediate position between the C-duct closed position and the C-duct open position. The C-duct actuators 64 may be configured as linear actuators such as, but not limited to, a ball screw actuator. Each of the C-duct actuators 64 extends between and connects a respective one of the C-duct doors 48 with a fixed structure of the nacelle 22 such as, but not limited to, the fixed structure 54. FIG. 1 illustrates an exemplary position of the C-duct actuators 64 at (e.g., on, adjacent, or proximate) the fan case 44, however, the present disclosure is not limited to the foregoing exemplary position of the C-duct actuators 64. The C-duct actuators 64 of FIG. 4 include a RH C-duct actuator 64A for the RH C-duct door 48A and a LH C-duct actuator 64B for the LH C-duct door 48B. However, the C-duct actuators 64 may include more than one RH C-duct actuator 64A for the RH C-duct door 48A and more than one LH C-duct actuator 64B for the LH C-duct door 48.

Each of the C-duct actuators 64 includes an electric motor 76 configured to drive each respective C-duct actuator 64 to position a respective one of the C-duct doors 48 in the C-duct closed position, the C-duct open position, or an intermediate position between the C-duct closed position and the C-duct open position. Each of the electric motors 76 of FIG. 4 are integrated with or otherwise disposed at (e.g., on, adjacent, or proximate) an actuator body 78 of a respective one of the C-duct actuators 64. In the event that power is unavailable for one or more of the electric motors 76, each of the C-duct actuators 64 and their respective electric motors 76 may be configured to facilitate manual operation of the C-duct doors 48. For example, the C-duct actuators 64 may be configured to be back-driven by the C-duct doors 48 to allow an operator to manually open the C-duct doors 48.

Each of the C-duct actuators 64 may include a manual drive unit 74. The manual drive unit 74 is configured to facilitate manual actuation (e.g., linear actuation) of a respective one of the C-duct actuators 64, for example, in the event that power is unavailable for the electric motor 76 of the respective one of the C-duct actuators 64. The manual drive unit 74 facilitates manual operation (e.g., opening) of a respective one of the C-duct actuators 64 by an operator, for example, using a tool configured to interface with the manual drive unit 74.

The controller 66 includes a processor 80 connected in signal communication with memory 82. The processor 80 may include any type of computing device, computational circuit, processor(s), CPU, computer, field-programmable gate array (FPGA), or the like capable of executing a series of instructions that are stored in the memory 82. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the control assembly 60 and its components to accomplish the same algorithmically and/or by coordination of the control assembly 60 components. The controller 66 may be connected in signal communication with each of the fan cowl actuators 62 and the C-duct actuators 64. For example, the controller 66 may be connected in signal communication with one or more position sensors or temperature sensors of the fan cowl actuators 62 and/or the C-duct actuators 64 as well as their respective electric motors 70, 76. The controller 66 may also be connected in signal communication with one or more other electronic control systems of the propulsion system 20 and/or the aircraft on which the propulsion system 20 is installed. The controller 66 of FIG. 4 is connected in signal communication with an aircraft control system 84 disposed outside of the propulsion system 20 (see FIG. 1). The controller 66 may be configured, for example, to detect a high-temperature (e.g., overheating) condition of one or more of the actuators 62, 64 or their electric motors 70, 76 and provide a signal to the aircraft control system 84 identifying the detected high-temperature condition. The memory 82 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 66. The controller 66 may include, or may be in communication with, an input device that enables a user to enter data and/or instructions, and may include, or be in communication with, an output device configured, for example to display information (e.g., a visual display or a printer), or to transfer data, etc. Communications between the controller 66 and other electrical and/or electronic components (e.g., controllers, sensors, etc.) may be via a hardwire connection or via a wireless connection. A person of skill in the art will recognize that portions of the controller 66 may assume various forms (e.g., digital signal processor, analog device, etc.) capable of performing the functions described herein.

The controller 66 of FIG. 4 is electrically connected to each of the fan cowl actuators 62 and each of the C-duct actuators 64. The controller 66 of FIG. 4 is further electrically connected to one or more power supplies of the propulsion system 20 and/or the aircraft on which the propulsion system 20 is installed (see FIG. 1). For example, the controller 66 of FIG. 4 is electrically connected with a low-voltage power supply 86 and a high-voltage power supply 88. The controller 66 receives electrical power from the low-voltage power supply 86 for operation of the controller 66 (e.g., for electronic components of the controller 66 such as the processor 80 and memory 82). The controller 66 is configured to control and distribute electrical power from the high-voltage power supply 88 to each of the fan cowl actuators 62 (e.g., the electric motors 70) and each of the C-duct actuators 64 (e.g., the electric motors 76) to drive the electric motors 70, 76, 88 for positioning the fan cowl doors 36 and the C-duct doors 48, respectively. For example, the controller 66 may direct electrical power from the high-voltage power supply 88 to the electric motor 70 of each fan cowl actuator 62 to position the fan cowl doors 36 and to the electric motor 76 of each C-duct actuator 64 to position the C-duct doors 48. The controller 66 may convert electrical power from the high-voltage power supply 88 to a form suitable for operation of the electric motors 70, 76. For example, the controller 66 may include or otherwise function as an inverter (e.g., a frequency converter) to control a voltage and/or frequency of the electrical power supplied to the electric motors 70, 76. The low-voltage power supply 86 and the high-voltage power supply 88 may include or otherwise be formed by electrical power sources of the propulsion system 20 and/or the aircraft on which the propulsion system 20 is installed such as, but not limited to, a battery, a generator, an auxiliary power unit (APU), or the like. The controller 66 may be disposed within the nacelle 22. For example, the controller 66 of FIG. 1 is disposed within the pylon 32. The location of the controller 66 within the pylon 32 may facilitate reduced exposure of the controller 66 to high temperatures and temperature variations (e.g., from the engine core). However, the location of the controller 66 is not limited to the foregoing exemplary controller 66 location of FIG. 1 and the controller 66 may alternatively be located at other portions on or within the nacelle 22 such as, but not limited to, the fan case 34. While the controller 66 is described above as being electrically connected to each of the fan cowl actuators 62 and each of the C-duct actuators 64, it should be understood that the controller 66 may alternatively be electrically connected to only the fan cowl actuators 62, only the C-duct actuators 64, or other combinations actuators for nacelle moveable structures.

The plurality of operating switches 68 includes outer operating switches 90 and inner operating switches 92. The outer operating switches 90 are connected in signal communication with the controller 66. The outer operating switches 90 are configured to facilitate operation of the fan cowl actuators 62 to position the fan cowl doors 36. The outer operating switches 90 of FIG. 4 include a RH operating switch 90A for the RH fan cowl actuator 62A and a LH operating switch 90B for the LH fan cowl actuator 62B. Referring to FIG. 1, the outer operating switches 90 may be disposed on the outer structure 24 of the nacelle, for example, on an inlet portion of the outer structure 24 forward of the fan case 34. The outer operating switches 90 are accessible by an operator from an exterior of the propulsion system 20 and its nacelle 22. The outer operating switches 90 are configured to provide a signal to the controller 66 to control the fan cowl actuators 62 (e.g., the electric motors 70) to open, close, or hold a position of the fan cowl doors 36.

The inner operating switches 92 are connected in signal communication with the controller 66. The inner operating switches 92 are configured to facilitate operation of the C-duct actuators 64 to position the C-duct doors 48. The inner operating switches 92 of FIG. 4 include a RH operating switch 92A for the RH C-duct actuator 64A and a LH operating switch 92B for the LH C-duct actuator 64B. Referring to FIG. 1, the inner operating switches 92 may be disposed within the outer structure 24 of the nacelle. For example, the inner operating switches 92 may be disposed on the fan case 34 or on an inlet aft bulkhead of the nacelle 22 inside of (e.g., radially inside of) the fan cowl 28. Accordingly, the inner operating switches 92 may be accessible by an operator only after the respective fan cowl doors 36 have been opened, thereby facilitating sequential opening of the fan cowl doors 36 subsequent to opening of the C-duct doors 48. The inner operating switches 92 are configured to provide a signal to the controller 66 to control the C-duct actuators 64 (e.g., the electric motors 76) to open, close, or hold a position of the C-duct doors 48.

In at least some conventional cowl control assemblies, each cowl actuator may include a discrete controller (e.g., an inverter) located with the cowl actuator within the nacelle (e.g., the fan case). This configuration increases actuator size as well as the amount of wiring which must be routed through the nacelle to each individual cowl actuator controller. In at least some other conventional cowl control assemblies, the cowl actuators may be connected by mechanical linkages, drive shafts, or other mechanical connections to a remotely located motor or other mechanical power source for the cowl actuators, thereby increasing cowl control system weight and complexity. The present disclosure control assembly 60 architecture facilitates elimination or reduction of redundant controller functions, saves space at the locations of each of the nacelle actuators (e.g., the fan cowl actuators 62 and the C-duct actuators 64), and minimizes the amount of electrical power wiring and signal wiring which must be routed through the nacelle 22.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An assembly for an aircraft propulsion system, the assembly comprising:
   a nacelle including an outer structure including a fan cowl and a thrust reverser;
      the fan cowl includes at least one fan cowl door, and the at least one fan cowl door is movable between a fan cowl open position and a fan cowl closed position; and
      the thrust reverser includes at least one C-duct door, and the at least one C-duct door is movable between a C-duct open position and a C-duct closed position;
   at least one fan cowl actuator mounted to the at least one fan cowl door, each of the at least one fan cowl actuator including a fan cowl actuator electric motor configured to drive a respective one of the at least one fan cowl actuator to move the at least one fan cowl door between the fan cowl open position and the fan cowl closed position;
   at least one C-duct actuator mounted to the at least one C-duct door, each of the at least one C-duct actuator including a C-duct actuator electric motor configured to drive a respective one of the at least one C-duct actuator to move the at least one C-duct door between the C-duct open position and the C-duct closed position;
   a controller electrically connected to the fan cowl actuator electric motor for each of the at least one fan cowl actuator and the C-duct actuator electric motor for each of the at least one C-duct actuator, and the controller includes a processor in communication with a non-transitory memory storing instructions, which instructions when executed by the processor, cause the processor to:
      selectively direct electrical power from a power supply to:
         the fan cowl actuator electric motor for each of the at least one fan cowl actuator to control a fan cowl position of the at least one fan cowl door using the at least one fan cowl actuator; and
         the C-duct actuator electric motor for each of the at least one C-duct actuator to control a C-duct position of the at least one C-duct door using the at least one C-duct actuator;
   at least one outer operating switch disposed on the outer structure and connected in signal communication with the controller to facilitate operation of the at least one fan cowl actuator; and
   at least one inner operating switch disposed within the at least one fan cowl door and connected in signal communication with the controller to facilitate operation of the at least one C-duct actuator.

2. The assembly of claim 1, wherein the nacelle further includes a pylon, and the controller is disposed at the pylon.

3. The assembly of claim 1, wherein the instructions, when executed by the processor, further cause the processor to control the controller to:
   receive a first electrical power from the power supply;
   form a second electrical power by changing one or both of a voltage or a frequency of the first electrical power; and
   distribute the second electrical power to the fan cowl actuator electric motor for each of the at least one fan cowl actuator or the C-duct actuator electric motor for each of the at least one C-duct actuator.

4. The assembly of claim 1, wherein the at least one outer operating switch is configured to direct a fan cowl actuator control signal to the controller to selectively direct electrical power from the power supply to the fan cowl actuator electric motor for each of the at least one fan cowl actuator to control the fan cowl position of the at least one fan cowl door using the at least one fan cowl actuator.

5. The assembly of claim 4, wherein the at least one inner operating switch is configured to direct a C-duct actuator control signal to the controller to selectively direct electrical power from the power supply to the C-duct actuator electric motor for each of the at least one C-duct actuator to control the C-duct position of the at least one C-duct door using the at least one C-duct actuator.

6. The assembly of claim 1, wherein the at least one fan cowl door includes a first fan cowl door and a second fan cowl door, and the at least one fan cowl actuator includes a first fan cowl actuator mounted to the first fan cowl door and a second fan cowl actuator mounted to the second fan cowl door.

7. The assembly of claim 1, wherein the at least one C-duct door includes a first C-duct door and a second C-duct door, and the at least one C-duct actuator includes a first C-duct actuator mounted to the first C-duct door and a second C-duct actuator mounted to the second C-duct door.

8. The assembly of claim 1, wherein each of the at least one C-duct actuator includes a manual drive unit.

9. The assembly of claim 1, wherein the instructions, when executed by the processor, further cause the processor to:
   detect a high-temperature condition of one or more of the at least one fan cowl actuator and the at least one C-duct actuator; and
   provide a signal to an aircraft control system identifying the detected high-temperature condition.

10. An assembly for an aircraft propulsion system, the assembly comprising:
- a nacelle including a first pivotable door and a second pivotable door, and each of the first pivotable door and the second pivotable door is pivotable between an open position and a closed position;
- a first actuator mounted to the first pivotable door, the first actuator includes a first actuator body and a first electric motor disposed at the first actuator body, and the first electric motor is configured to drive the first actuator to move the first pivotable door between the open position and the closed position;
- a second actuator mounted to the second pivotable door, the second actuator includes a second actuator body and a second electric motor disposed at the second actuator body, and the second electric motor is configured to drive the second actuator to move the second pivotable door between the open position and the closed position;
- a controller electrically connected to the first electric motor and the second electric motor, and the controller includes a processor in communication with a non-transitory memory storing instructions, which instructions when executed by the processor, cause the processor to:
  - selectively direct electrical power from an aircraft power supply to:
    - the first electric motor to control a first position of the first pivotable door using the first actuator; and
    - the second electric motor to control a second position of the second pivotable door using the second actuator;
- at least one outer operating switch disposed on an exterior of the nacelle and connected in signal communication with the controller to facilitate operation of the first actuator; and
- at least one inner operating switch disposed within the first pivotable door and connected in signal communication with the controller to facilitate operation of the second actuator.

11. The assembly of claim 10, wherein the nacelle further includes a pylon, and the controller is disposed at the pylon.

12. The assembly of claim 10, wherein the instructions, when executed by the processor, further cause the processor to control the controller to:
- receive a first electrical power from the power supply;
- form a second electrical power by changing one or both of a voltage or a frequency of the first electrical power; and
- distribute the second electrical power to the first electric motor and the second electric motor to control the first position of the first pivotable door using the first actuator and to control the second position of the second pivotable door using the second actuator, respectively.

13. The assembly of claim 10, further comprising a fan case, and the first actuator and the second actuator are disposed axially coincident with the fan case.

14. The assembly of claim 13, wherein the controller is disposed outside of the fan case.

15. An assembly for an aircraft propulsion system, the assembly comprising:
- a nacelle including an outer structure including a first structure portion and second structure portion, the first structure portion includes at least one first moveable door, the at least one first moveable door is movable between a first door open position and a first closed door position, the second structure portion includes at least one second moveable door, and the at least one second moveable door is movable between a second door open position and a second door closed position;
- at least one first actuator mounted to the at least one first moveable door, and each of the at least one first actuator includes a first electric motor configured to drive a respective one of the at least one first actuator to move the at least one first moveable door between the first door open position and the first door closed position;
- at least one second actuator mounted to the at least one second moveable door, and each of the at least one second actuator includes a second electric motor configured to drive a respective one of the at least one second actuator to move the at least one second moveable door between the second door open position and the second door closed position;
- a controller electrically connected to the first electric motor for each of the at least one first actuator, the second electric motor for each of the at least one second actuator, and a power supply, and the controller includes a processor in communication with a non-transitory memory storing instructions, which instructions when executed by the processor, cause the processor to:
  - receive first electrical power from the power supply;
  - form a second electrical power by changing one or both of a voltage or a frequency of the first electrical power; and
  - selectively distribute the second electrical power to the first electric motor for each of the at least one first actuator or the second electric motor for each of the at least one second actuator;
- at least one outer operating switch disposed on the outer structure and connected in signal communication with the controller to facilitate operation of the at least one first actuator; and
- at least one inner operating switch disposed within the at least one first moveable door and connected in signal communication with the controller to facilitate operation of the at least one second actuator.

16. The assembly of claim 15, further comprising a fan case, and the at least one first actuator is disposed axially coincident with the fan case.

17. The assembly of claim 16, wherein the controller is disposed at the fan case.

18. The assembly of claim 17, wherein the instructions, when executed by the processor, further cause the processor to:
- detect a high-temperature condition of one or more of the at least one first actuator and the at least one second actuator; and
- provide a signal to an aircraft control system identifying the detected high-temperature condition.

19. The assembly of claim 18, wherein the instructions, when executed by the processor, further cause the processor to:
- isolate the second electrical power to the first electric motor for each of the at least one first actuator or the second electric motor for each of the at least one second actuator in response to the detected high-temperature condition.

20. The assembly of claim 15, wherein:
- the at least one outer operating switch is configured to direct a first actuator control signal to the controller to selectively direct electrical power from the power supply to the first actuator electric motor for each of the at least one first actuator to control a first door position of the at least one first moveable door using the at least one first actuator; and the at least one inner operating switch is configured to direct a second actuator control signal to the controller to selectively direct electrical power from the power supply to the second actuator electric motor for each of the at least one second actuator to control a second door position of the at least one second moveable door using the at least one second actuator.

* * * * *